United States Patent
Gaultier et al.

[11] Patent Number: 6,057,826
[45] Date of Patent: May 2, 2000

[54] METHOD AND DEVICE FOR MANAGING THE RELATIVE DISPLACEMENT OF A CURSOR IN RELATION TO THE IMAGE DISPLAYED ON A VIEWING DEVICE

[75] Inventors: Philippe Gaultier, Le Chesnay; Patrick Vouillon, Villebon Sur Yvette; Marie-Hélène Debrus, Billancourt, all of France

[73] Assignee: Sextant Avionique, Meudon La Foret Cedex, France

[21] Appl. No.: 08/781,176

[22] Filed: Apr. 18, 1996

Related U.S. Application Data

[63] Continuation of application No. 08/285,144, Aug. 3, 1994, abandoned.

[30] Foreign Application Priority Data

Sep. 2, 1993 [FR] France .................................. 93 10550

[51] Int. Cl.⁷ ...................................................... G09G 5/08
[52] U.S. Cl. ........................ 345/145; 545/157; 545/159; 341/34
[58] Field of Search ................................ 345/145, 156, 345/157, 158–159, 161, 163, 164–169; 340/983, 945; 341/20, 34, 35; 348/734; 463/37, 38

[56] References Cited

U.S. PATENT DOCUMENTS

| | | | |
|---|---|---|---|
| 3,613,060 | 10/1971 | Legrand | 340/870.18 |
| 3,643,148 | 2/1972 | Brown et al. | . |
| 4,313,113 | 1/1982 | Thornburg | 345/145 |
| 4,550,221 | 10/1985 | Mabusth | . |
| 4,663,705 | 5/1987 | Kishi et al. | . |
| 4,680,577 | 7/1987 | Straayer et al. | 345/160 |
| 4,725,829 | 2/1988 | Murphy | . |
| 4,763,100 | 8/1988 | Wood | 338/128 |
| 4,801,931 | 1/1989 | Schmidt | . |
| 4,812,829 | 3/1989 | Ebina et al. | 345/145 |
| 4,853,630 | 8/1989 | Houston | 345/156 |
| 4,975,689 | 12/1990 | Suzuki et al. | . |
| 5,191,641 | 3/1993 | Yamamoto et al. | 395/118 |
| 5,229,742 | 7/1993 | Miyamoto et al. | 338/128 |
| 5,235,868 | 8/1993 | Culver | 74/471 X |
| 5,252,952 | 10/1993 | Frank et al. | 345/157 |
| 5,278,557 | 1/1994 | Stokes et al. | . |
| 5,293,529 | 3/1994 | Yoshimura et al. | 345/158 |
| 5,299,307 | 3/1994 | Young | 345/157 |
| 5,300,927 | 4/1994 | Arai et al. | 345/157 |
| 5,327,161 | 7/1994 | Logan et al. | 345/157 |
| 5,340,061 | 8/1994 | Vaquier et al. | . |
| 5,365,254 | 11/1994 | Kawamoto | 345/157 |
| 5,398,044 | 3/1995 | Hill | 345/157 |
| 5,404,152 | 4/1995 | Nagai | 345/157 |
| 5,414,801 | 5/1995 | Smith et al. | 345/157 |
| 5,453,758 | 9/1995 | Sato | 345/158 |

FOREIGN PATENT DOCUMENTS

| | | | |
|---|---|---|---|
| 0056315 | 7/1982 | European Pat. Off. | . |
| 4000523 | 1/1992 | Japan | G06F 3/03 |

*Primary Examiner*—Lun-Yi Lao
*Attorney, Agent, or Firm*—Browdy and Neimark

[57] ABSTRACT

With a view to bringing the cursor into a zone of the image displayed on a screen, the method embodying the invention uses a displacement mode comprising determination and indication on the screen of the orientation and relative direction of displacement one wishes to obtain, this stage being performed by varying the orientation of the index (C) by a first manual command until the required direction is obtained; relative displacement of the cursor (C) in relation to the image, in accordance with the orientation and direction thus determined until it reaches said zone, this displacement being performed by a second command distinct from the first; and validation of the position occupied by the cursor in relation to the image by a third command distinct from the first two. The invention relates equally to conventional management of a cursor, the plotting of the route of an aircraft or even to multidirectional scrolling of an image on a screen.

22 Claims, 4 Drawing Sheets

METHOD AND DEVICE FOR MANAGING THE RELATIVE DISPLACEMENT OF A CURSOR IN RELATION TO THE IMAGE DISPLAYED ON A VIEWING DEVICE

This application is a continuation of application Ser. No. 08/285,144, filed Aug. 3, 1994, now abandoned.

BACKGROUND OF THE INVENTION

1. Field of the Invention

This invention relates to a method and device for managing the relative displacement of a cursor on a viewing device in relation to an image of which at least one part is displayed on this device.

2. Description of the Prior Art

Generally, it is known that man-processor communications increasingly use on-screen displaying of a cursor that the operator must displace in order to designate locations on the screen representative of data to be entered or even of functions to be performed.

Numerous solutions have therefore been proposed to enable the operator to control displacement of the cursor and to validate the locations designated by the latter.

However, the most widely used of these solutions at present, such as direction keys provided on the keyboard assigned to the processor, mice and trackballs, (or thumballs) are unsuitable or even prohibited in certain applications, notably in the case of dialogue terminals equipping the cockpits of aircraft.

Mouse operation requires a large flat horizontal surface which is incompatible with cockpit environments.

Trackballs, which use a sphere to be rotated by the operator's finger, are difficult tools to make tight and are therefore difficult to integrate in a cockpit. Moreover, they have proved to be somewhat unpractical and to lack precision.

The direction keys on the keyboard are not ergonomical and only enable cursor displacement according to four axes.

In order to obviate these drawbacks, proposals have also been made with regard to touch-sensitive work boards capable of detecting displacement of the operator's finger with a view to guiding the cursor displayed on the screen.

However, these touch-sensitive work boards, which perform very well, have the drawback of requiring a relatively sizeable operating space.

OBJECT OF THE INVENTION

The main object of this invention is to remedy the preceding disadvantages, particularly to provide a method capable of using a man-machine interface of reduced dimensions that can be manoeuvred irrespective of how the hand is orientated, and yet enabling highly accurate selection and plotting to be carried out. This method is equally suited to relative displacement of the "mobile cursor/fixed image" type and of the "fixed cursor/mobile image" type.

SUMMARY OF THE INVENTION

Accordingly, in order to achieve this end with a view to controlling relative displacement of the cursor in relation to the image and to thus bring said cursor into a predetermined zone of this image, this method comprises a displacement mode comprising the following stages:

determination and indication on the screen of the orientation and relative direction of displacement one wishes to obtain, this stage being performed by varying the orientation of the index by a first manual command until it corresponds to the required direction, relative displacement of the cursor in relation to the image, according to the orientation and direction thus determined until it reaches said zone, this displacement being performed by a second command distinct from the first one, validation of the position occupied by the cursor in relation to the image, by means of a third command distinct from the first one.

Advantageously, the first command can consist in rotating a rotatable control device, rotation thereof entailing rotation of the axis displayed on the screen.

Likewise, the second and third commands can consist in exerting pressure on the control device, below a predetermined pressure threshold in the case of the second command, and above said threshold in the case of the third command.

The method embodying the invention can further comprise a stage consisting in prior selection of the operating mode, and a stage consisting in initializing the cursor operating mode, this initialization stage being triggered by detection of the presence of an operator's finger on or near the control device.

The invention also relates to a device for implementing the method previously described, this device comprising:

a control element mounted rotatably on a fixed structure, a means enabling the detection of the angular position of the control element and transmission thereof in the form in a digital signal to a processor, a means enabling the displaying, on a screen, of a cursor capable of pivoting about one of its points so as to indicate an orientation and a direction corresponding to the angular position of the control element, a means susceptible of detecting pressure exerted on the control element, and of transmitting to the processor a control signal when the pressure detected exceeds a predetermined threshold, a means enabling the performance of relative cursor/image displacement in said direction in response to the control signal, a means susceptible of transmitting, to the processor, a validation signal in response to action by the operator on the validation device, this validation signal triggering the taking into account of the cursor's position by the processor.

BRIEF DESCRIPTION OF THE DRAWINGS

Further features and advantages of the invention will be apparent from an embodiment of the invention described hereinunder, by way of a non-limiting example, in reference to the corresponding accompanying drawings in which.

DESCRIPTION OF THE PREFERRED EMBODIMENTS

Figure 1:
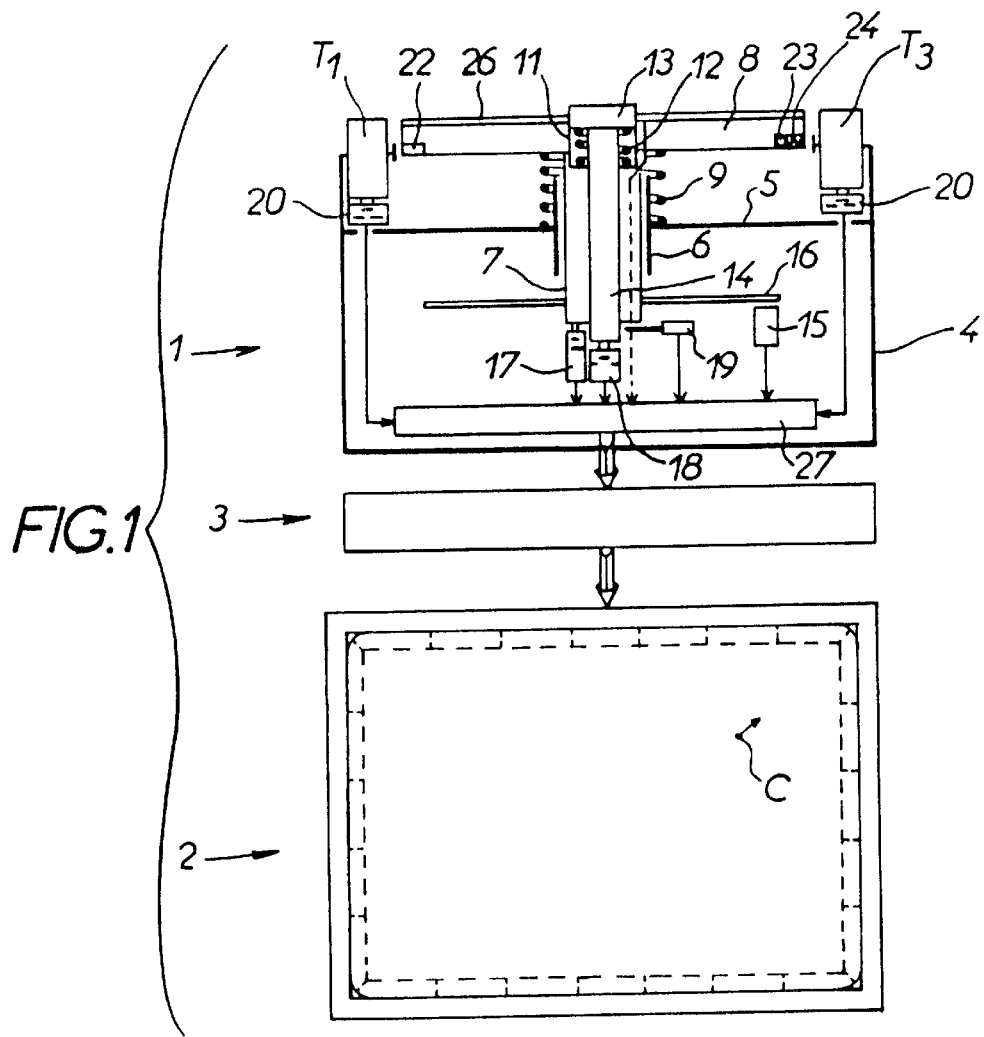
FIG. 1 is a schematic representation of a device embodying the invention using a cursor management terminal represented in a vertical axial sectional drawing.
Figure 2:
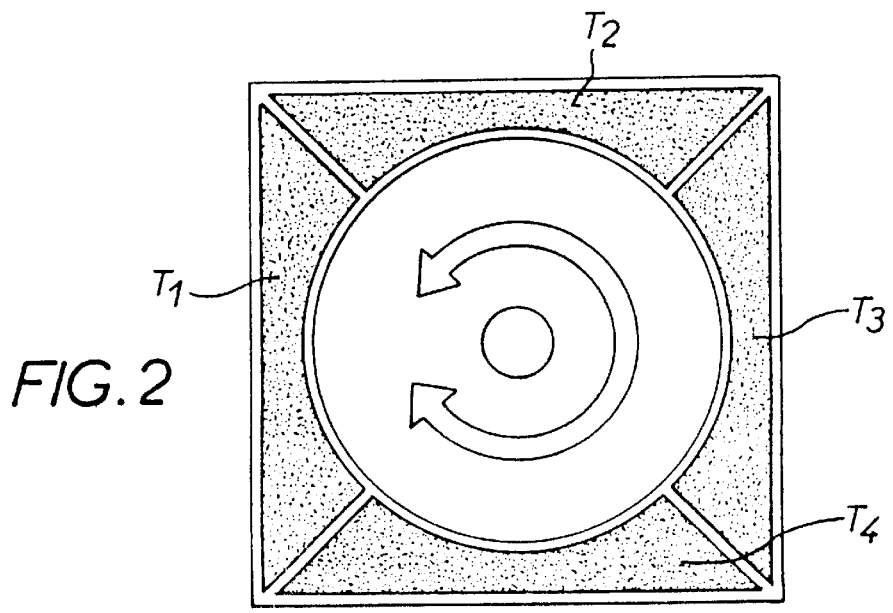
FIG. 2 is a top view of the terminal represented in FIG. 1.

In the example represented in FIG. 1, the terminal 1 is intended to manage a cursor C displayed on the screen 2 of a display device associated with a processor 3.

This terminal 1 comprises a parallelepiped-shaped case 4 of which the upper side 5 is equipped with a vertical central bearing 6 in which a tubular rotary shaft 7 can rotate and axially slide.

This rotary shaft 7 bears, at its upper end, a rotary disk 8 which extends parallel to the upper side 5.

The shaft 7—disk 8 assembly is axially held in position by a compression spring 9 arranged coaxially between the upper side 5 and the disk 8.

The disk 8 further comprises a coaxial central cavity 11 which communicates with the interior volume of the tubular shaft 7, and in which is slidably mounted, with return motion ensured by a spring 12, a coaxial thrustor 13 integral with a rod 14.

Furthermore, the case 4 houses:
- a detector 15 disposed facing a code wheel 16 borne by the tubular shaft 7, coaxially with the latter,
- a microswitch 17 disposed below the tubular shaft 7 in order to be operated by the latter when, subsequent to the exertion of pressure on the disk 8, the shaft 7 moves downwards, against the action of the spring 9, by more than a predetermined stroke,
- a microswitch 18 disposed below the end of the rod 14 protruding from the lower end of the tubular shaft 7 in order to be operated when pressure is exerted on the thrustor 13, and
- an optional strain gauge 19 positioned parallel to and in replacement of the microswitch 17 so as to obtain a signal that is proportional to the strain exerted on the disk 8.

In this example, the upper side 5 of the case 4 houses four trapezoidal-shaped function keys T1 to T4 with a curved base portion which occupy the space included between the disk 8 and the lateral edges of the case 4. These function keys T1 to T4 act on respective switches 20 mounted on the upper side 5.

The cylindrical surface of the disk 8 is fitted with a notched track 22 on which is borne a ball 23 solicited by a spring 24 supported on the case 4, so as to generate a tactile sensation when the disk 8 is rotated.

The upper side of the disk 8 can be covered with a touch-sensitive layer 26 susceptible of detecting the presence of a finger or hand in the immediate vicinity of the disk 8, or even a light touching of the latter.

The switches 17, 18, 20, the detector 15, the strain gauge 19 and the touch-sensitive layer 26 are connected to an interfacing circuit 27 which shapes the signals provided by these elements and transmits them in suitable digital form to the processor 3.

As previously described, the terminal 1 enables a multiplicity of functions to be performed, such as notably a displacement of the cursor towards a point to be reached, with or without viewing of the plotting, the reading of a course and/or the distance from the cursor to a singular point, etc.

When the operator wishes to move the cursor from its position at point A towards a point X (FIG. 3), he firstly selects the corresponding operating mode by exerting pressure on a key 20, and then puts his fingers on the disk 8. The touch-sensitive surface 26 detects the presence of the fingers and informs the processor 3 thereof. The latter then displays an axis Δ' (in broken lines) passing through the center of the cursor C and showing the last orientation given to the latter. Advantageously, the cursor can be in the form of an arrow colinear with the axis Δ and be rotatably mobile with the latter, about a same point (point A).

The operator then pivots the disk 8, the angular data of this pivoting being transmitted to the processor 3 by the detector 15 which, in turn, causes the axis to pivot about the point A (choice of the orientation and direction of displacement of the cursor).

Of course, the operator continues to pivot the disk 8 until the axis Δ passes through the point X to be reached.

The operator then exerts pressure on the disk 8 in order to cause a commutating of the switch 17. The latter transmits a signal to the processor 3 which controls a displacement of the cursor C along the axis Δ, towards the point X to be reached.

In the case of the strain gauge 19 being used, the speed of displacement of the cursor C can be made proportional to the strain brought to bear on the disk 8 (to each value of the strain detected by the gauge 19 can correspond a predetermined forward speed value).

Once the cursor C has reached the point X required, the operator can press the thrustor 13 to bring about a commutating of the switch 18 and, thus, validation of the position of the cursor C. This validation can be translated by a taking into account of the coordinates of the cursor C by the processor 3, by a singularizing of the point X on the screen and, possibly, the erasing of the axis Δ.

Of course, by selecting a graphic mode, e.g. by acting on a key 20, the displacements of the cursor C can be viewed with an afterglow, in which case the plotting will persist after the axis Δ has been erased.

Figure 3:
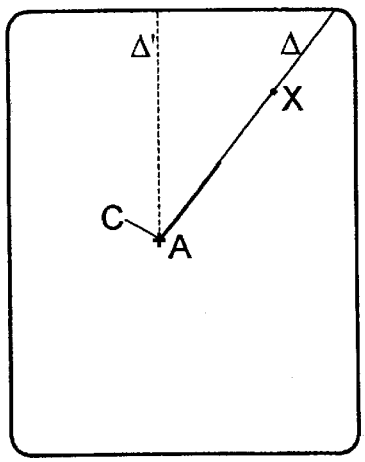
FIGS. 3, 4 and 5 are schematic representations of the screen enabling different operating modes of the device to be illustrated.

FIG. 3, which illustrates the process described above, shows the viewing on the screen of the path of the cursor from the initial position A towards a point X on the axis Δ (the initial direction Δ' of this axis Δ being indicated in broken lines).

Figure 4:
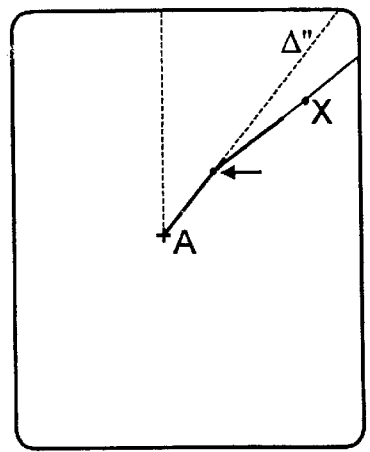

However, the operating mode used in this example is not unique: it would be possible, as a first stage, to roughly orientate the axis Δ" as represented in FIG. 4 in broken lines, and then to make one or more changes of direction to reach point X.

This change of direction can be achieved by rotating the disk 8, with or without interrupting displacement of the cursor, i.e. with or without pressing the disk 8.

It is clearly apparent that by combining the pressing and rotating of the disk 8, curved or even circular cursor paths can be obtained.

Figure 5:
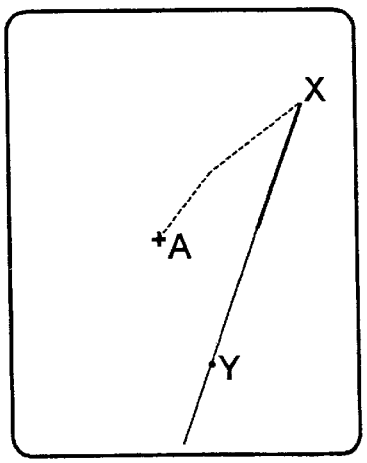
Figure 8:
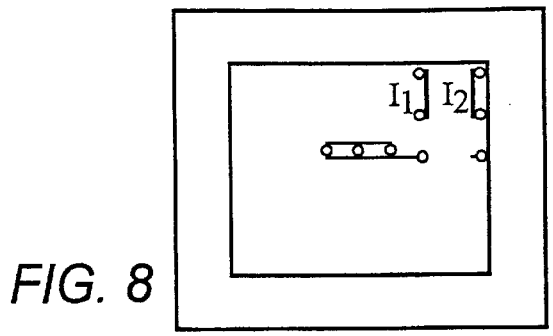
FIGS. 8 to 11 are schematic representations of a screen enabling a sequence of multidirectional image scrolling commands to be illustrated.
Figure 9:
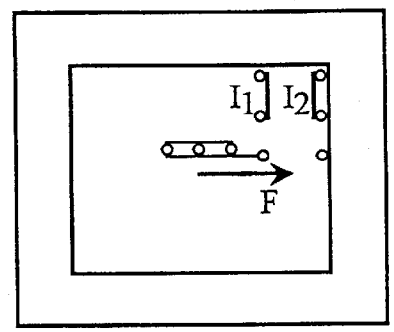
Figure 10:
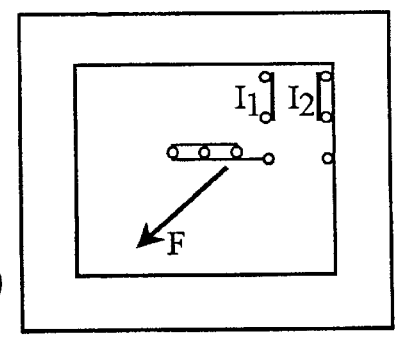

From point X, the cursor C can be brought to a point Y in a manner similar to that previously described (FIG. 5).

By way of these features, the terminal previously described provides numerous possibilities.

It enables e.g. the defining of the course the cursor must follow to reach the point required, and the distance separating the cursor from this point, with the possibility of this information being displayed on the screen once the axis linked to the cursor has been orientated so as to pass through this point and said orientation has been validated.

It enables speedy selection of control areas arranged e.g. around the screen 2 (e.g. in the manner indicated in broken lines in FIG. 1), by simply orientating the axis linked to the cursor C in such a way that it passes through the required area and by validating the corresponding orientation (without necessarily having to move the cursor along the axis Δ).

It further enables a value to be incremented or decremented if the point validated is a counter.

This invention is not, of course, limited to the embodiment previously described.

Figure 6:
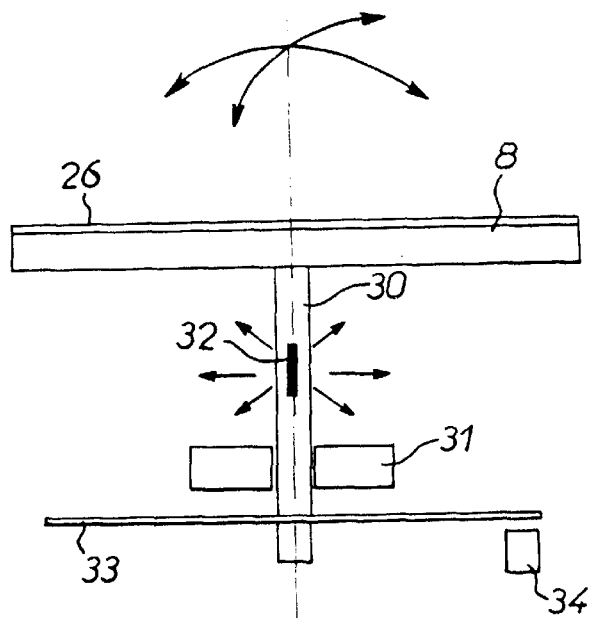
FIGS. 6 and 7 are schematic axial sectional representations of two further embodiments of the terminal.

In this way, as represented in FIG. 6, the disk 8, fitted with its touch-sensitive surface 26, can be borne by a shaft 30 of which the lower part is mounted rotatably in a bearing 31 while its flexible upper part is equipped with a strain gauge 32 serving the following two purposes:

detection of the order of displacement of the cursor C, determination of the speed of displacement of the cursor along the axis to which it is linked.

In this case, the angular position of the disk can be detected by means of a code wheel 33 and a detector 34.

Figure 7:
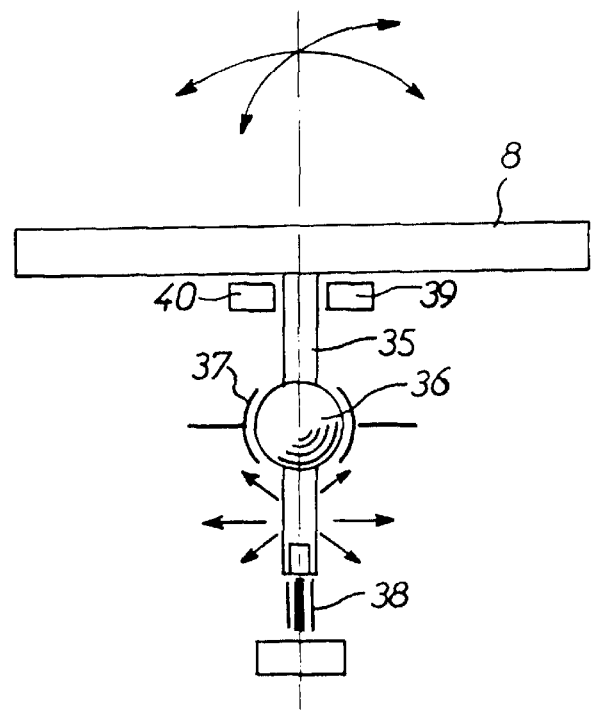

According to another embodiment illustrated in FIG. 7, the shaft 35, on which the disk 8 is borne, comprises a spherical portion 36 that rotates in all directions within shells of complementary shape 37 integral with the case. The lower end of shaft 35 is coupled in this instance with a strain gauge 38 ensuring detection of the order of displacement of the cursor C, of the direction of the axis Δ linked to the cursor and of the speed of displacement of the cursor C. In this case, the orientation of the axis linked to the cursor is not obtained by a rotating of the disk 8 but by a pressing of the disk at an orientated area (in relation to the center of the disk) corresponding to the required orientation of the axis linked to the cursor.

Stops 39, 40 can be provided in order to limit the tilting of the shaft 35.

The embodiments represented in FIGS. 6 and 7 can, of course, be combined in order to obtain a rough orientation of the axis Δ by exerting a pressure on the disk 8 and by then performing a fine adjustment of this orientation by pivoting the disk 8. In this case, the shaft 35 (FIG. 7) need only be fitted with a code wheel associated with a corresponding detector.

As previously mentioned, the method according to the invention can be used to control multidirectional scrolling of an image partially represented on the screen.

In this case, the screen is used as a window where the image can be displaced.

As for the index, it is rotatably mobile about a point which is fixed in relation to the screen.

FIGS. 8 to 11 illustrate an operating mode enabling the image to be scrolled with a view to centering the portion represented on the screen on a given object.

Figure 11:
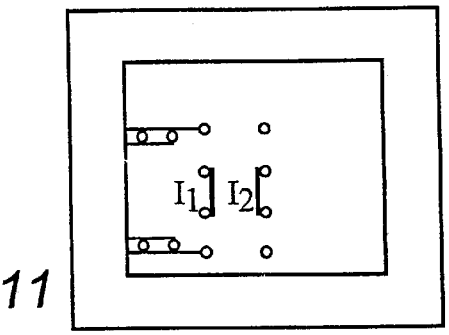

In this example, the image represents an electrical diagram comprising a double contact $I_1$, $I_2$ and the purpose of the scrolling is to position this double contact, which is initially in the upper right-hand corner of the screen (FIG. 8), in the center of the screen, as represented in FIG. 11.

In order to achieve this result, the operator firstly puts his finger on the disk 8.

Detection of the presence of the finger by the touch-sensitive layer then causes the appearance, in the center of the screen, of an index for selecting the orientation and direction of displacement of the image (FIG. 9) which is in the form of an arrow F.

The operator then rotates the disk 8 so as to orientate the index F in accordance with the required orientation and direction of displacement.

Once this orientation has been obtained, pressure on the disk 8 controls the displacement of the diagram according to the direction indicated by the index F (FIG. 10) until the centering of the double switch $I_1$, $I_2$ has been obtained (FIG. 11).

Alternatively, such a pressing can control a switching of the device to the "displacement" mode.

In this case, clockwise rotation of the disk 8 could control displacement of the image in the direction indicated by the index F, anti-clockwise rotation controlling displacement of the image in the opposite direction.

The method described above applies notably to the plotting of a route marked out with predefined way points.

Figure 12:
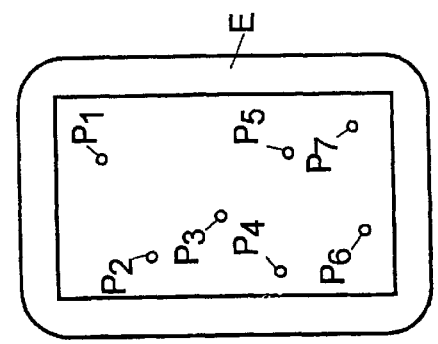

Such an application can be found illustrated in FIGS. 12 to 17 which represent a screen on which a set of way points $P_1$ to $P_7$ are initially displayed (FIG. 12).

Figure 13:
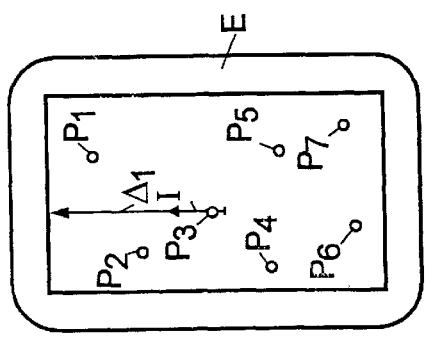

In order to plot the route, the operator firstly puts his finger on the disk 8 so as to bring about the displaying of an index I associated with a sweeping axis $\Delta_1$ (FIG. 13).

In this example, the index I is initially centered on point $P_3$.

Figure 14:
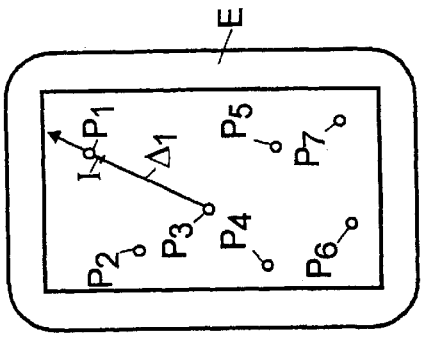
FIGS. 12 to 17 are schematic representations of a screen enabling the illustration of a route plotting sequence, said route to be followed by a vehicle such as, e.g. an aircraft.

The operator then turns the disk until the sweeping axis $\Delta_1$ intercepts the first point required (in this instance, point $P_1$ in FIG. 14).

Figure 15:
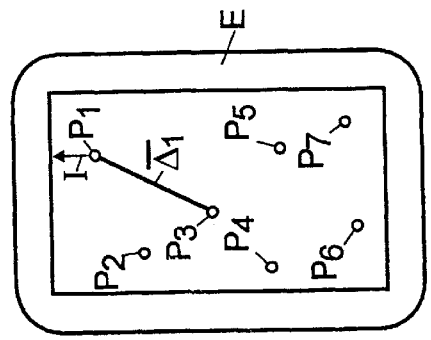

The operator then presses the disk 8 to plot the route section $\overline{\Delta_1}$ between the two points $P_3$, $P_1$. The center of rotation of the sweeping axis is then constituted by the first point designated $P_1$ (FIG. 15).

Figure 17:
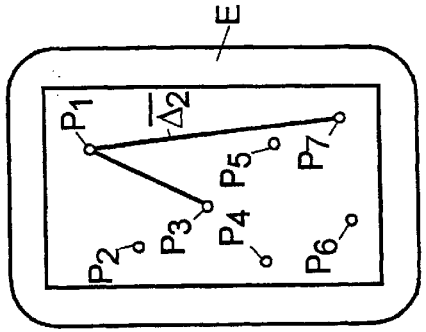
Figure 16:
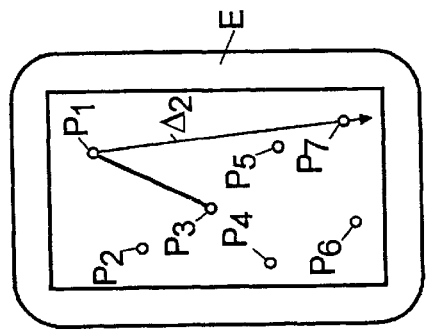

In FIG. 16, the operator subsequently rotates the disk 8 until the axis $\Delta_2$ associated with the index I intercepts the second point required (in this instance, point $P_7$, and plots the new route section of route $\overline{\Delta_2}$ by pressing on the disk 8 again (FIG. 17).

This process is then repeated until the last way point on the route is reached and until the last section of the route has been plotted.

When the plotting of the route ($\overline{\Delta_1}+\overline{\Delta_2}+ \ldots$ ) has been completed, the operator can validate it by exerting pressure on a validation key or by pressing the disk 8 twice.

We claim:

1. A method for managing the relative displacement of a cursor on a viewing screen, in relation to an image of which at least one part is displayed on said screen in order to bring the cursor into a predetermined area of said image, said cursor having a constant size, a current position and a current angular orientation, said method comprising the steps of:

determining on said screen and introducing a relative rotation angle required to bring the cursor from its current angular orientation to a relative angular orientation of said predetermined area with respect to the current cursor position, said introduction being performed by a first manual command by rotating a control member at said rotation angle, rotating said cursor at said rotation angle about a pivot point thereof from said current angular orientation to said relative angular orientation of said predetermined area, said rotation being performed progressively during rotation of said control member, translating the cursor and the pivot point thereof in relation to said image, in said relative angular orientation until it reaches said predetermined area, this translation being performed by a second manual command distinct and independent from the first one, and validating the position occupied by said cursor in relation to said image, by means of a third command distinct from said first one.

2. The method as claimed in claim 1, wherein said cursor is in the form of an arrow indicating an angular orientation of translation, and wherein said arrow pivots about one of its points under the effect of said first command.

3. The method as claimed in claim 1, wherein said image displayed on said screen is fixed, said cursor being rotatably and translatably mobile on the surface of said screen.

4. The method as claimed in claim 1, wherein the position of said pivot point is fixed, said image being mobile in relation to said screen, said screen then acting as a window where the image can be translated according to the angular orientation of translation indicated by said cursor.

5. The method as claimed in claim 1, wherein said second and third commands consist of pressures exerted on a control device so as to translate it, said pressure having values respectively below and above a predetermined pressure threshold.

6. The method as claimed in claim 1, applying to the controlling of multidirectional scrolling of an image partially represented on said screen, and comprising selecting the angular orientation of translation by means of the first command, and translating said image according to the angular orientation of translation by means of said second command until the required position of said image displayed on said screen is obtained.

7. The method as claimed in claim 1, further comprising the step of displaying an axis passing through said pivot point and indicating the orientation of said cursor, said first command causing pivoting of said axis with said cursor in a same manner about said pivot point.

8. The method as claimed in claim 7, further comprising detecting a presence of a finger or hand on or in the vicinity of a control device, this detection causing said axis and said cursor to be displayed.

9. The method as claimed in claim 1, further comprising the step of:

plotting of a route passing through a plurality of pre-defined way points displayed on said screen, said plotting including plotting steps of:

positioning of said cursor associated with a sweeping axis on a starting point, rotation of the cursor/sweeping axis assembly by means of said first command until said sweeping axis intercepts the first way point required, plotting of a first route section included between said starting point and a first point, with positioning of said cursor/sweeping axis assembly on said first point by a combination of said second command and the validation stage, rotation of said cursor/sweeping axis assembly about said first way point, by means of said first command, until said sweeping axis intercepts the second way point required, plotting of second route section included between said first way point and the second way point, and positioning of said cursor/sweeping axis assembly on said second way point, repeating of the plotting steps until the last way point is reached and until the last route section has been plotted, validation of the route thus determined.

10. A device for managing the relative displacement of a cursor on a viewing screen, in relation to an image of which at least one part is displayed on said screen in order to bring the cursor having a fixed length into a predetermined area of said image, said device comprising:

a control element mounted rotatably on a fixed structure, a means for detecting an angular position of said control element and a means for transmitting said angular position in the form of a digital signal to a processor, a means for displaying, on said screen, a cursor pivoting about one of its points and indicating an angular orientation, a means for progressively rotating the cursor during rotation of said control element so that the angular orientation of the cursor always corresponds to said angular position of said control element, a means for detecting pressure exerted on said control element, and a means for transmitting to said processor a control signal when the pressure exerted exceeds a predetermined threshold, a means for performing a relative cursor/image translation in said angular orientation in response to said control signal, a means for transmitting to said processor, a validation signal in response to an action of the operator on a validation device, said validation signal triggering taking into account of the position of said cursor by said processor.

11. The device as claimed in claim 10, further comprising a means for displaying on said screen an axis extending in the direction indicated by said cursor, and which pivots in the same manner about said point, and a means for erasing said axis subsequent to the transmission of said validation signal.

12. The device as claimed in claim 11, comprising a plurality of keys arranged around said control element.

13. The device as claimed in claim 11, wherein said control element is borne by a shaft having a lower part mounted rotatably in a bearing, and a flexible upper part equipped with a strain gauge which at the same time:

detects an order of displacement of said cursor, determines a speed of displacement of said cursor along the axis to which it is linked.

14. The device as claimed in claim 11, wherein said control element is borne by a shaft articulated on a fixed structure by means of a pivoting pin link, and wherein said shaft is coupled to a strain gauge for detecting at the same time an order of translation of said cursor, the angular orientation of the cursor and the axis linked to said cursor and the speed of translation of said cursor along said axis.

15. The device as claimed in claim 14, wherein said shaft is further equipped with a code wheel associated with a detector.

16. The device as claimed in claim 11, wherein said control element consists of a disk borne by a coaxial shaft which is axially mobile against the action of an elastic means and mounted pivotably on a fixed structure, said means for detecting the pressure exerted on said control element consisting of a switch or strain gauge sensitive to the axial displacements of said shaft.

17. The device as claimed in claim 16, wherein said means for detecting the angular position of said disk consists of a code wheel borne by said shaft and associated with a detector.

18. The device as claimed in claim 16, wherein said shaft is tubular, and wherein said means for transmitting a validation signal to said processor consists of a thrustor mounted slidably with return action by means of a spring in a central cavity coaxial with said disk and which is integral with a rod sliding axially in said shaft, said rod having an end protruding from said shaft, which cooperates with a switch.

19. A device for managing the relative displacement of a cursor on a viewing screen, in relation to an image of which at least one part is displayed on said screen in order to bring the cursor into a predetermined area of said image, said device comprising:

a control element mounted rotatably on a fixed structure, a means for detecting an angular position of said control element and a means for transmitting said angular position in the form of a digital signal to a processor, a means for displaying, on said screen, a cursor pivoting about one of its points and indicating an angular orientation corresponding to said angular position of said control element, a touch-sensitive layer covering said control element for detecting presence and/or contact of an operator's finger, and for causing displaying of an axis linked to said cursor subsequent to a detection, and pivoting in the same manner about said point, and a means for erasing said axis subsequent to the transmission of a validation signal, a means for detecting pressure exerted on said control element, and a means for transmitting to said processor a control signal when the pressure exerted exceeds a predetermined threshold, a means for performing a relative cursor/image translation in said angular orientation in response to said control signal, a means for transmitting, to said processor, said validation signal in response to an action of the operator on a validation device, said validation signal triggering taking into account of the position of said cursor by said processor.

20. A device for managing the relative displacement of a cursor on a viewing screen, in relation to an image of which at least one part is displayed on said screen in order to bring the cursor into a predetermined area of said image, said device comprising:

a control element mounted rotatably about a rotation point on a fixed structure, a means for detecting a rotation angle of said control element and a means for transmitting said rotation angle in the form of a digital signal to a processor, means for detecting pressure exerted on said control element and for detecting an angular orientation, with respect to said rotation point, of an orientated point on which said pressure is exerted, and a means for transmitting said angular orientation and pressure in the form of a digital signal to a processor, a means for displaying, on said screen, a cursor pivoting about one of its points and indicating an angular orientation corresponding to said detected angular orientation, in order to obtain a rough angular orientation of the cursor, a means for rotating said cursor from its current angular orientation at an angle corresponding to said detected rotation angle, in order to obtain a fine angular orientation of the cursor, a means for detecting pressure exerted on said control element, and a means for transmitting to said processor a control signal when the pressure exerted exceeds a predetermined threshold, a means for performing a relative cursor/image translation in said angular orientation in response to said control signal, and a means for transmitting, to said processor, a validation signal in response to an action of the operator on a validation device, said validation signal triggering taking into account of the position of said cursor by said processor.

21. A method for managing the relative displacement of a cursor on a viewing screen, in relation to an image of which at least one part is displayed on said screen in order to bring the cursor into a predetermined area of said image, said cursor having a constant size, a current position and a current angular orientation, said method comprising the steps of:

determining on said screen and introducing a relative angular orientation of said predetermined area with respect to the current cursor position, said introduction being performed by a first manual command by exerting a pressure on a control device so as to cause it to tilt in an angular orientation corresponding to said relative angular orientation of said predetermined area, rotating said cursor at said rotation angle about a pivot point thereof from said current angular orientation to said relative angular orientation of said predetermined area, translating the cursor and the pivot point thereof in relation to said image, in said relative angular orientation until it reaches said predetermined area, this translation being performed when said pressure exceeds a predetermined threshold, and validating the position occupied by said cursor in relation to said image, by means of a second command distinct from said first one.

22. A method for displacing a cursor on a viewing screen along a curved cursor path, said method comprising the steps of:

displaying on said viewing screen a cursor having a constant size, a current position and a current angular orientation, and being rotatable about its current position, providing a rotation speed signal corresponding to a rotation speed applied to a rotatable control member by an operator, providing a translation speed signal corresponding to a pressure exerted on said control member by said operator, displacing continuously said cursor on said screen by rotating its current angular orientation about its current position at a speed indicated by said rotation speed signal, and by translating its current position in its current angular orientation at a speed indicated by said translation speed signal.

* * * * *